(12) United States Patent
Gambhir et al.

(10) Patent No.: US 11,144,539 B2
(45) Date of Patent: Oct. 12, 2021

(54) SYSTEM AND METHOD FOR TRACKING EVENTS

(71) Applicants: Nitin Gambhir, San Carlos, CA (US); Gaurav Ahuja, Glendale, CA (US)

(72) Inventors: Nitin Gambhir, San Carlos, CA (US); Gaurav Ahuja, Glendale, CA (US)

( * ) Notice: Subject to any disclaimer, the term of this patent is extended or adjusted under 35 U.S.C. 154(b) by 143 days.

(21) Appl. No.: 16/540,923

(22) Filed: Aug. 14, 2019

(65) Prior Publication Data

US 2019/0370252 A1 Dec. 5, 2019

Related U.S. Application Data

(63) Continuation of application No. 13/899,195, filed on May 21, 2013, now Pat. No. 10,430,404.

(51) Int. Cl.
*G06F 16/23* (2019.01)
*G06F 16/2458* (2019.01)
*G06Q 10/10* (2012.01)
*G06Q 50/00* (2012.01)

(52) U.S. Cl.
CPC ...... *G06F 16/2379* (2019.01); *G06F 16/2477* (2019.01); *G06Q 10/10* (2013.01); *G06Q 50/01* (2013.01)

(58) Field of Classification Search
USPC ........................................................ 707/746
See application file for complete search history.

(56) References Cited

U.S. PATENT DOCUMENTS

| 5,367,619 | A | * | 11/1994 | Dipaolo | G06F 8/38 715/221 |
| 2003/0189484 | A1 | * | 10/2003 | Rust | A63B 24/0021 340/323 R |
| 2004/0148417 | A1 | * | 7/2004 | Roh | H04L 29/06 709/230 |
| 2009/0158194 | A1 | * | 6/2009 | Jensen | G06F 3/04847 715/780 |

* cited by examiner

*Primary Examiner* — Muluemebet Gurmu
(74) *Attorney, Agent, or Firm* — Richard Swope

(57) ABSTRACT

A system and method for keeping track of events. In the preferred embodiment, a counter is created on a mobile device and is set to update one or more values based on the occurrence of a triggering event. The triggering event may be based on the user pressing a button or otherwise interacting with the mobile device, or may be based on other functions of the mobile device, such as the arrival in a particular location as determined by GPS. Counters may be shared with other mobile devices, and data in the counters may be stored on the mobile device or in a remote location. Mobile devices can share data from their counters with other mobile devices, and counters can be set to compare data between different mobile devices. Alerts can be set based on predetermined criteria.

25 Claims, 8 Drawing Sheets

SYSTEM AND METHOD FOR TRACKING EVENTS

This application is a continuation of U.S. patent application Ser. No. 13/899,195, filed May 21, 2013, and further claims the benefit of U.S. Provisional Application No. 61/650,081, filed May 22, 2012.

BACKGROUND OF THE INVENTION

Every person, on some level, keeps track of certain events in their lives. We do this not only because of our innate nature to record certain events, but sometimes because we have to—for medical reasons, for budget reasons, for competitive reasons, or merely out of curiosity. This system provides users the ability to keep track of events (abstract or otherwise) through the use of simple tally counters that may be updated as soon as the user experiences the event.

The user creates a profile (through a registration page)—this creates a new account. Then the user adds a counter for each event the user wants to keep track of. The newly added counter gets added to the users' main page (or dashboard). Multiple counters associated with each event are created in a similar fashion and they get added to the users' dashboard. When an event associated with the counter occurs, the user records the occurrence through a click of a button. The system may allow a user associate cost with a particular counter. This way, the user can also keep track of any costs associated with the event.

The system keeps track of number of the occurrences and associated cost of such events on a daily, weekly, monthly or yearly basis (as set by the users' preference). The system can be implemented through the World Wide Web or through smart phone applications.

SUMMARY OF THE INVENTION

A system and method for tracking events is described herein. In the preferred embodiment, a counter is created on a mobile device by assigning the counter a name, creating one or more datafields in memory, associating each datafield with one or more tags, initializing each datafield, and associating an event with the counter. Thereafter, upon occurrence of the event, the datafields are updated. In the preferred embodiment, the updating of the datafields can include incrementing or decrementing the current value by a preset amount. In another embodiment, the counter may also have an icon or picture associated with it.

In another embodiment, the counter can be created on a nonmobile device, such as a desktop computer.

In another embodiment, the updating of the datafields can include adding user-entered data into one or more datafields. This user-entered data could be a number, text, a time stamp, an email address, a phone number, a photograph, an audio recording, a video recording, or any other data supplied by the user. The datafields can be implemented to maintain only the current value of the datafield, or may be implemented to store historical data as well. The datafields can be implemented in local memory, or in remote memory. One or more of the datafields may also be implemented as one or more databases.

In another embodiment, the creation of the counter includes creating the counter from a template or selecting a predefined counter. Names of counters and tags associated with each datafield may be predetermined, selected from a predetermined list, or may be user created. The event associated with the counter can be predetermined, selected from a predetermined list, or user created.

Upon occurrence of the event, the counter is triggered. In the preferred embodiment, the counter is triggered by the user interacting with the mobile device when the event occurs. In another embodiment, the counter is triggered upon arrival at a predetermined location, at a predetermined date or time, or after use of one or more functions on the device.

In the preferred embodiment, once the counter is triggered and the datafields updated, the counter may display on the device the value of one or more of the updated datafields. In another embodiment, the datafields to be displayed are predefined, are selected from a predetermined list, or are user defined. In another embodiment, the datafields are only displayed if a predefined criterion is met, such as the updated data in one or more of the datafields being above or below some threshold, the passage of a predetermined amount of time, or other user-defined criteria. In another embodiment, either along with the display or instead of the display, the counter may also sound an alarm, cause the device to vibrate, send an email or text message, or another user-defined action.

Coincident with the display of the datafields on the device, the counter can communicate information to another device. In the preferred embodiment, the counter on the mobile device can wirelessly communicate to another device that a counter has been triggered. In another embodiment, the data communicated to another device can include the name of the counter, the updated value of one or more datafields, the tag associated with one or more datafields, the time and date associated with the event, device identification information, user identification information, any other data stored in the datafields, or other user-defined information. In another embodiment, the communication need not be wireless.

In the preferred embodiment, the mobile device may also wirelessly receive data about an event that caused a counter on another device to trigger. In another embodiment, the data communicated to another device can include the name of the counter, the updated value of one or more datafields, the tag associated with one or more datafields, the time and date associated with the event, device identification information, user identification information, any other data stored in the datafields, or other user-defined information. In another embodiment, the communication need not be wireless.

In the preferred embodiment, the counter may also include one or more datafields comprising one or more lists of devices, along with identifying information for each device, such that the counter can communicate information in accordance with the preferred embodiment or other embodiments to one or more devices in the one or more lists. In another embodiment, a role may be assigned to each of the devices in the lists, wherein each role is associated with one or more events and, for each event, a predetermined set of information that will be communicated to each device associated with that role when the event is triggered. In another embodiment, a role may be associated with one or more comparison algorithms that allow the device to compare data received from another device with data in an associated counter and display the results of the comparison on the device.

In another embodiment, the system can be implemented as a server-based system, wherein the counters created on the mobile device are stored on a server, and the mobile device communicates with the server then an event occurs.

In another embodiment, the mobile devices do not communicate directly with one another, but instead communicate with the server and then the server communicates with the mobile devices.

DETAILED DESCRIPTION

Figure 1:
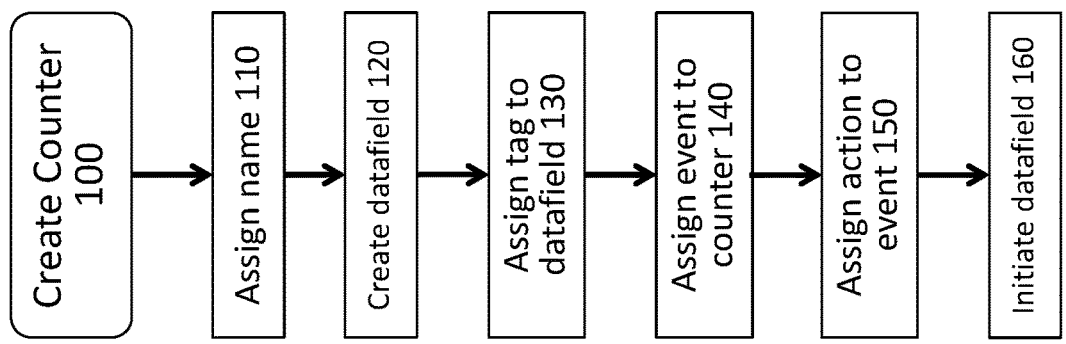
FIG. 1 illustrates a flowchart of a counter created in accordance with the preferred embodiment.

In FIG. 1, in the preferred embodiment, the user of the mobile device first creates a counter 100 on the device. The counter 100 may be a software application, or "app," on a mobile phone or other mobile device. At a minimum, each counter 100 has a name 110, one or more datafields 120 associated with the counter 100, a tag 130, or name, for each datafield 120, and event 140 associated with the counter 100, and an action 150 that the counter 100 takes once the event 140 occurs. The counter app may include predefined counters, templates for creating counters, or a system for creating custom counters, or any combination of the three.

Although the preferred embodiment is described as a mobile device, the invention described herein is not limited to a mobile device. Desktop computers, laptop computers, in particular, may also implement the system and method described herein.

The name 110 of a counter 100 can be predefined, selected from a predetermined list, or user-entered. The name 110 of the counter 100 is used by the device and the user to identify a particular counter 100. Numerous counters may be implemented on a single device. The user may also choose to assign an icon, picture, or other graphical representation to the counter 100.

Each counter 100 has one or more datafields 120 associated with it. Each datafield 120 stores a particular type of data. The data stored in a datafield 120 may be an integer value, a floating-point value, text, a picture, an audio recording, a video recording, a time stamp, a location, or any other sort of data that a user might wish to associate with a particular counter 100.

Each datafield 120 is associated with a tag 130 that identifies the datafield 120. The tag 130 may be an alphanumeric character or set of characters, an octal or hexadecimal value, an address in memory, or any other method used to uniquely identify a particular datafield 120 within a counter 100. In the preferred embodiment, each datafield 120 is given a user-readable tag 130 that ideally provides some indication of the data stored within the datafield 120. The tag 130 may be predefined, selected from a predefined list, or user-created.

Once datafields 120 are defined, the datafields 120 are initialized 160. The initialization value will depend on the data type stored in each datafield 120. For example, an integer datafield might be initialized to "0," whereas a text datafield might be initialized to state that no data has yet been entered. For certain types of counters 100, the user may wish to specify a different initialization value for a particular datafield 120.

The user then associates an event 140 with the counter. The event 140 may be predefined, selected from a predefined list, or user-created. In the preferred embodiment, the event 140 associated with the counter 100 is the user interacting with the mobile device. For example, if the user of the mobile device has associated an icon with the counter 100, when the user selects the icon on the mobile device—by touching the icon with a finger, for example—that is the event 140 that the counter 100 triggers on. This is one example of a triggering event 140. Other events could include, but are not limited to, scanning a barcode or QC code using the camera on the mobile device, receiving an email, SMS, phone call, or other communication, entering a particular location identified by the mobile device's GPS, entering an area with Wi-Fi access, taking a photograph, using another app or functionality on the device, a voice command, a gesture, pressing a button on the device, etc. The trigger may also be a particular time or date, the passage of a certain amount of time, triggering of another trigger, or based on any other function of the device.

Once the event 140 occurs, the device proceeds to update one or more of the datafields 120 in the counter. In the preferred embodiment, a datafield 120 containing an integer value is incremented by one upon occurrence of the event 140. In this way, the counter 100 contains a running total of the number of times the event 140 has occurred. Although the preferred embodiment is described as using an integer that is incremented, any data modification can be implemented. For example, an integer can also be decremented, or incremented or decremented by a value other than one. A floating point value can be increased or decreased by any value. A text datafield will have a character or characters added to the datafield.

A datafield can be overwritten, so that is contains only the most recent updated value, or may be implemented as a stack or database so that is contains past values of the counter. In the preferred embodiment, a counter with an integer datafield would also include a second datafield that would store a timestamp, so that each time the integer datafield is modified, a timestamp is also stored so a historical record of when each event occurred can be maintained.

Figure 2:
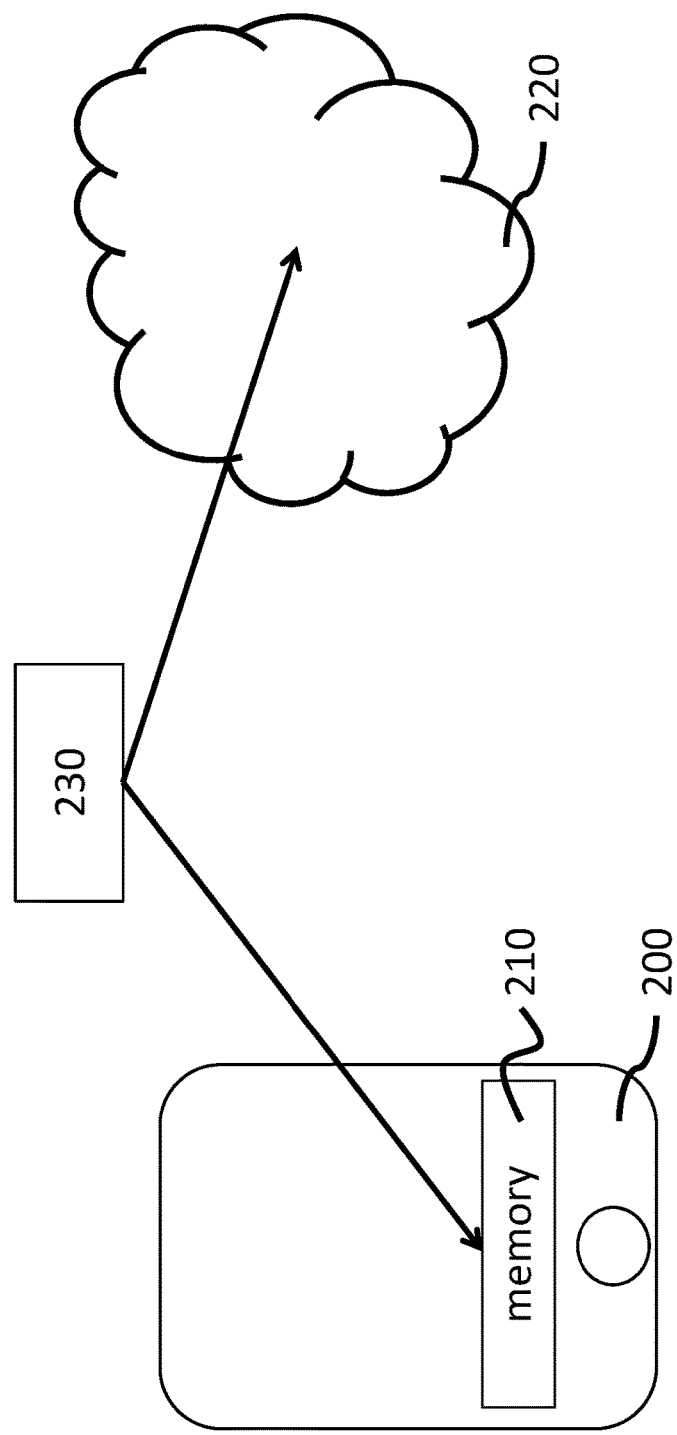
FIG. 2 illustrates an example of a different memory models for storing counters implemented in accordance with an embodiment of the invention.

In FIG. 2, in the preferred embodiment, the datafields are created in and stored in the device's 200 local memory 210, but the invention is not limited to storing data 230 in local memory 210. For example, a user may desire to minimize the amount of data 230 stored on a mobile device 200, and choose to store the data 230 associated with a counter in a cloud-based storage system 220. Another example would be to keep only the current data values resident on the local device 200, while storing historical data in a remote location, such as a cloud-based system 220.

Figure 3:
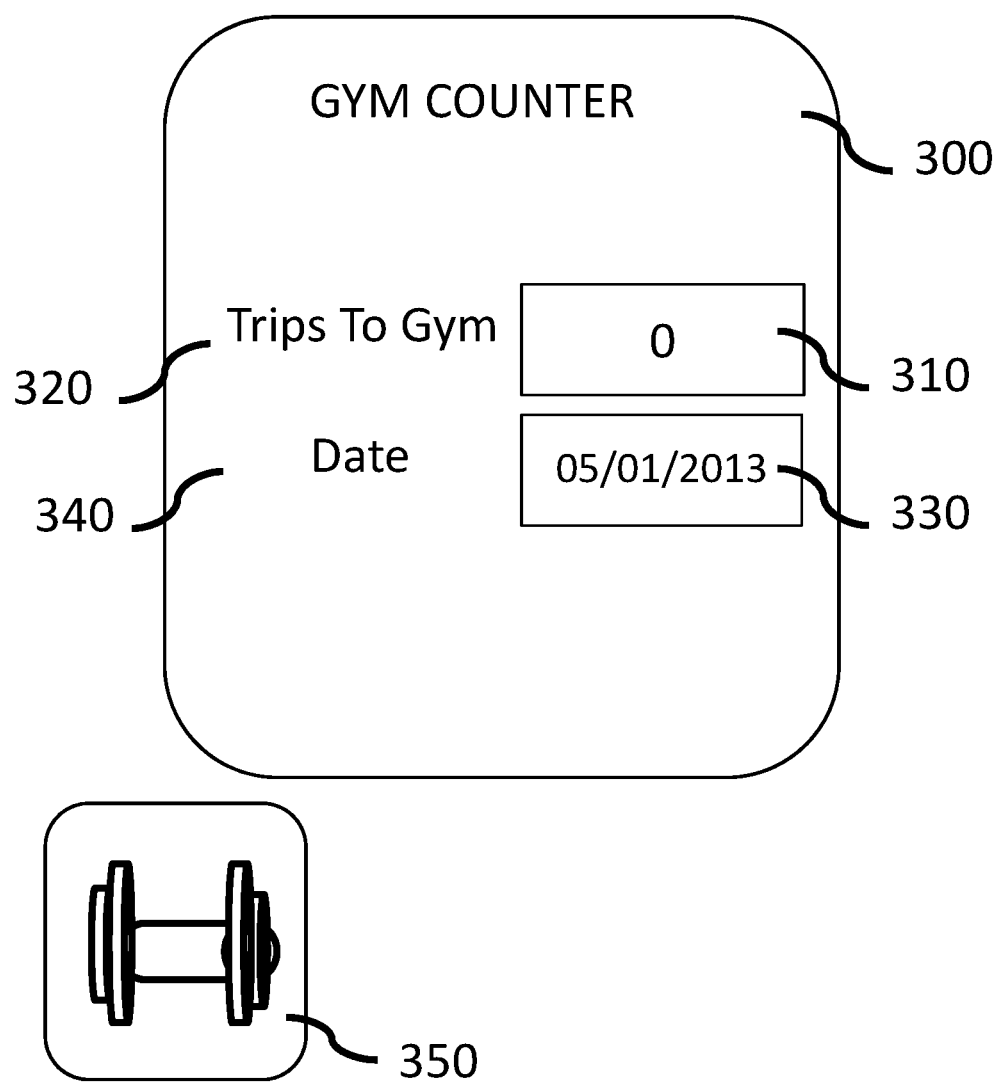
FIG. 3 illustrates an example of a gym counter implemented in accordance with an embodiment of the invention.

FIG. 3 shows an example of a counter created in accordance with the preferred embodiment. In this example, a mobile device user wishes to record trips to the gym. The user starts the counter app to create a new counter, which is called the "gym" counter 300. The name may be selected from a predefined list, or user-entered. To start, the user decides that a simple integer value is sufficient for his or her needs. The user creates an integer datafield 310 with the tag 320 "trips to the gym," and creates a second datafield 330 for timestamps with the tag 340 "date." To keep things simple, the user assigns an icon 350 to the counter 300, so that it is easy to access on the mobile device, and chooses pressing the icon 350 on the screen as the event associated with the counter 300. When the creation of the counter 300 is completed, the "trips to the gym" datafield 310 is initialized with a zero value, and the "date" datafield 330 is initialized with the current time and date. He also chooses to keep a historical record rather than overwriting each value.

The next time the user goes to the gym, the user selects the "gym" icon 350 on his mobile device, and the counter 300 increments the value in "trips to the gym" and adds the current time and date to the "date" datafield 330. Each time the user goes to the gym, he selects the "gym" icon 350 and both datafields are incremented.

Although a simple counter as described in the foregoing paragraphs provides a useful record of the number and timing of trips to the gym, there are many other extensions to this basic functionality that can greatly increase the value of the counter. For example, many mobile devices include GPS or other localization technologies that allow the user of a mobile device to determine where they are. In the "gym" example above, the counter could be modified so that when the GPS in the device detects that the user has arrived at the gym, the counter could be triggered automatically so that the user does not have to remember to press the icon each time. The counter could be modified so that when the user enters any one of a number of predefined gyms the counter is triggered.

Further, the counter could be modified to record data related to his workout. If the mobile device includes a heart-rate monitor, that data could be captured and included in a datafield. The user could create one or more text datafields to input information on exercises, times, repetitions, weights, etc. Any data that the mobile device has the capability of capturing, or any data that the user decides to input, can be included in one or more datafields associated with the counter.

Further embodiments of the invention provide further extensions to the core functionality of the counter. The counter can be configured to display information on the device. The counter may be configured to display the value of one or more datafields each time the counter is updated, on user demand, or based on predetermined criteria, or any combination of the above. For example, in the simplest implementation, the counter would display the updated value for each datafield each time an event occurs. However, a user may choose to only have the device display a subset of the datafields, or only display datafields when the user wants to see them, for example, by selecting the counter icon. The counter may also be configured to display the values of one or more datafields based on some criterion, such as the passage of a predetermined time, or when a datafield crossed some threshold. The counter may also be configured to completely hide data until a criterion is met.

The counter may also be configured to display something other than a datafield. Such a display may include a message or some other indicator that signals a user when a criterion has been met. The counter may also be configured that a beep, noise, music or other sound is played along with or in place of a visual display. A counter may be configured to cause a device to vibrate or "wake up" along with or in place of a visual display. The counter may be configured to display a picture or play a video along with or in place of a visual display or any of the other alerts described herein.

In the gym example above, the user may want to know when he has been to the gym 5 times in a given week, so he can set the counter 300 to display the number of trips to the gyms only when there have been five events in a week's time. Alternatively, the user may want to know when he has plateaued on a given exercise, and may set up the counter 300 to display a message if he has had a certain number or trips to the gym where he has not increased the weight or reps or both for a given exercise. Alternatively, a user whose primary goal is to lose (or gain) weight may configure the counter 300 with a datafield where he enters his weight each trip to the gym, and where the counter 300 will alert him once he reaches his goal weight.

Figure 4:
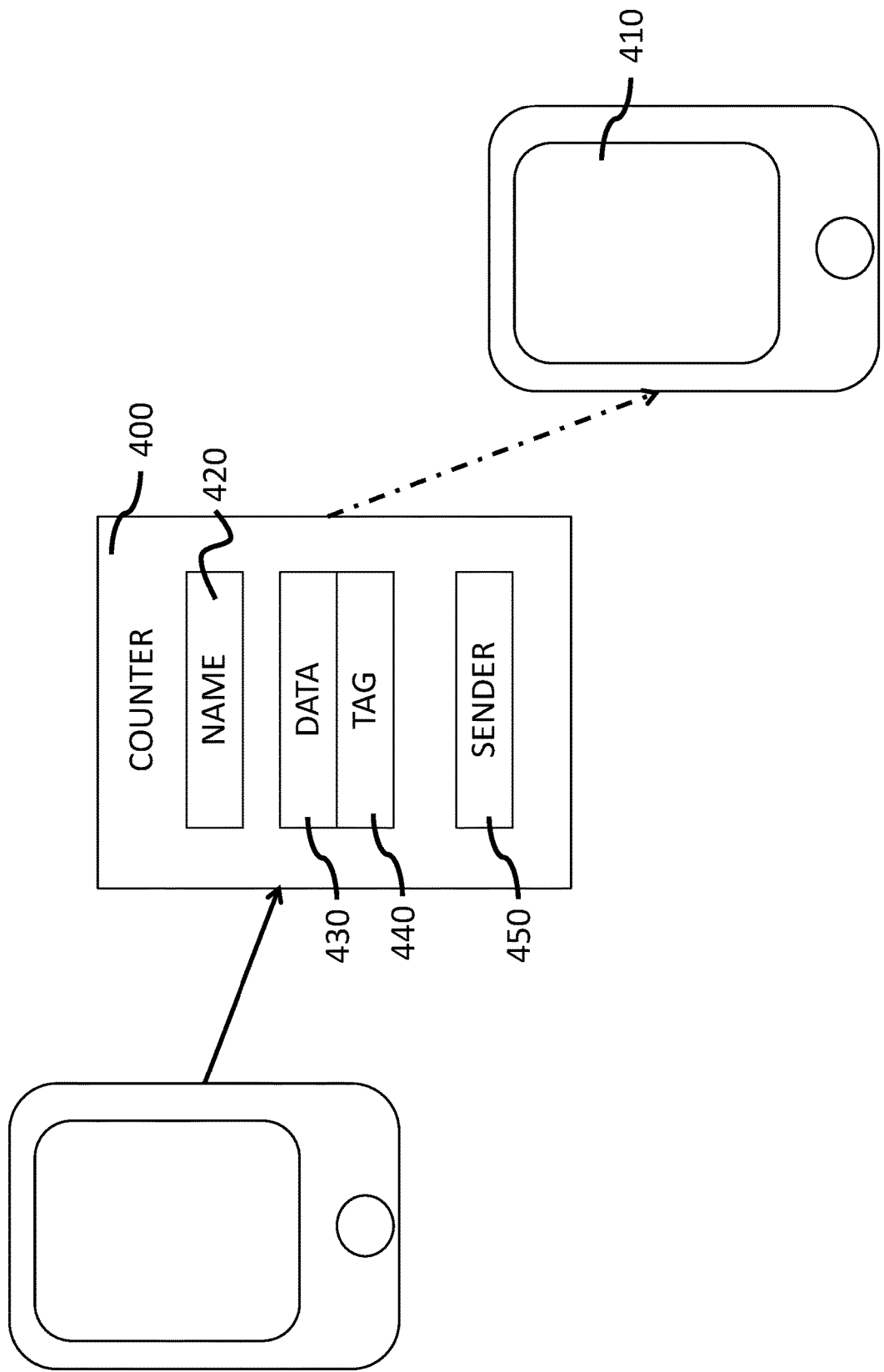
FIG. 4 illustrates an example of communication of counters implemented in accordance with an embodiment of the invention.

As shown in FIG. 4, the counter may also be configured to communicate with other devices or systems. A counter 400 may be configured to wirelessly send information to another device or system 410. Preferably, the information would include the name 420 of the counter 400, the updated value of one or more datafields 430, the tag 440 associated with the one or more datafields 430, and information 450 identifying the sending device. The communicated information may include other data or user-defined information. The device identification information could include an email address, a phone number, a hashtag, a username, or any other information that can be used to identify the sending device. The wireless communication could be via TCP/IP, SMS, or any other communications protocol. The communication need not be wireless. The communicated information may be sent to a social networking system, such as Facebook, Google+, Twitter, Pinterest, or any other system, website, or protocol that allows a user to post information.

Further, the counter may be configured such that if the device is not able to communicate when the event occurs, the communication will be set to occur once the device is able to communicate again. For example, in the gym example above, if the gym has no wireless reception, the user may need to manually press the icon to trigger the gym event. The counter may be configured to that once the device again had wireless reception, the counter will communicate at that time.

Further, the counter may be configured to receive information from other devices or systems. A counter may be configured to wirelessly receive information, including the name of the counter, the updated value of one or more datafields, the tag associated with the one or more datafields, and information identifying the sending device. The communicated information may include other data or user-defined information. The device identification information could include an email address, a phone number, a hash tag, a username, or any other information that can be used to identify the sending device. The wireless communication could be via TCP/IP, SMS, or any other communications protocol. The communication need not be wireless. Once the counter receives information from another device, it can display the information in the same manner as it displays any other information, as described in detail above.

Further, the counter may be configured to compare information received from other devices with its own information. A counter may be configured to compare received information with related information stored in one or more datafields and display the results of the comparison. The counter may display both values along with identifying information, or it can perform operations on the data and display the results of the operations. For example, the counter could determine whether one value is larger or smaller than the other, and only display the larger or smaller value, or only display the device identification information associated with the larger or smaller value. The counter could add the values to one another, or perform any other mathematical, Boolean or logical operation on the two values, and display the result of the operation. The counter could be configured to compare both values to a predetermined criteria, and display the closer (or further) value, or the device identification associated with the closer (or further) value. These examples are not exhaustive; other operations or comparisons are expressly contemplated, and what the counter is configured to ultimately display is similarly not limited to these examples. Further, the display may be any of the types of displays or alerts detailed above.

Figure 5:
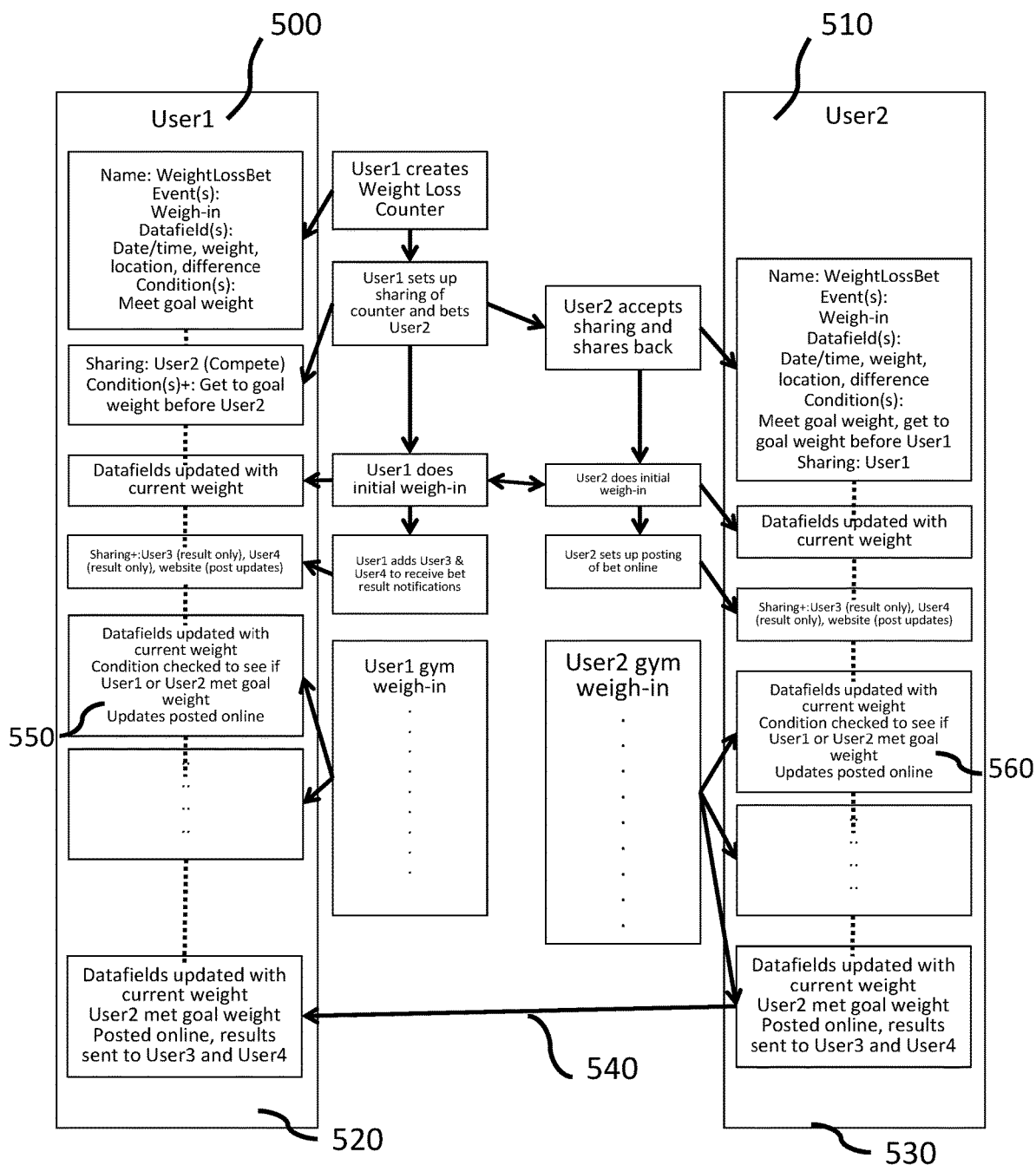
FIG. 5 illustrates an example of a weight loss competition counter implemented in accordance with an embodiment of the invention.

FIG. 5 shows another implementation of the gym example above. In this example, two different users 500 and 510 may both have created similar or identical "gym" counters 520 and 530 on their respective mobile devices. The two users could configure their respective counters 520 and 530 to communicate 540 with the other each time they go to the gym, so they can track who is going more often or more regularly. They could configure their respective counters 520 and 530 to determine who is lifting more weight, or taking more reps, and have an alert set up to show which of them is currently lifting the heavier weights, for example. If both are trying to lose weight, as in the above example, the counters could be configured to send both the current weight and the goal weight 550 and 560 to the other device, and each counter could be configured to calculate who is closer to their goal (either in absolute numbers, as a percentage, or any other calculation) and display who is in the lead.

The counter may also be configured to include multiple devices or services to communicate with. The user may configure a list within the counter that includes a list of devices and/or services that the counter can communicate with, along with identification information for each device and/or service. Identification information may include an email address, a phone number, a hash tag, or any other information that the counter can use to uniquely identify a device or service and communicate information to it.

Figure 6:
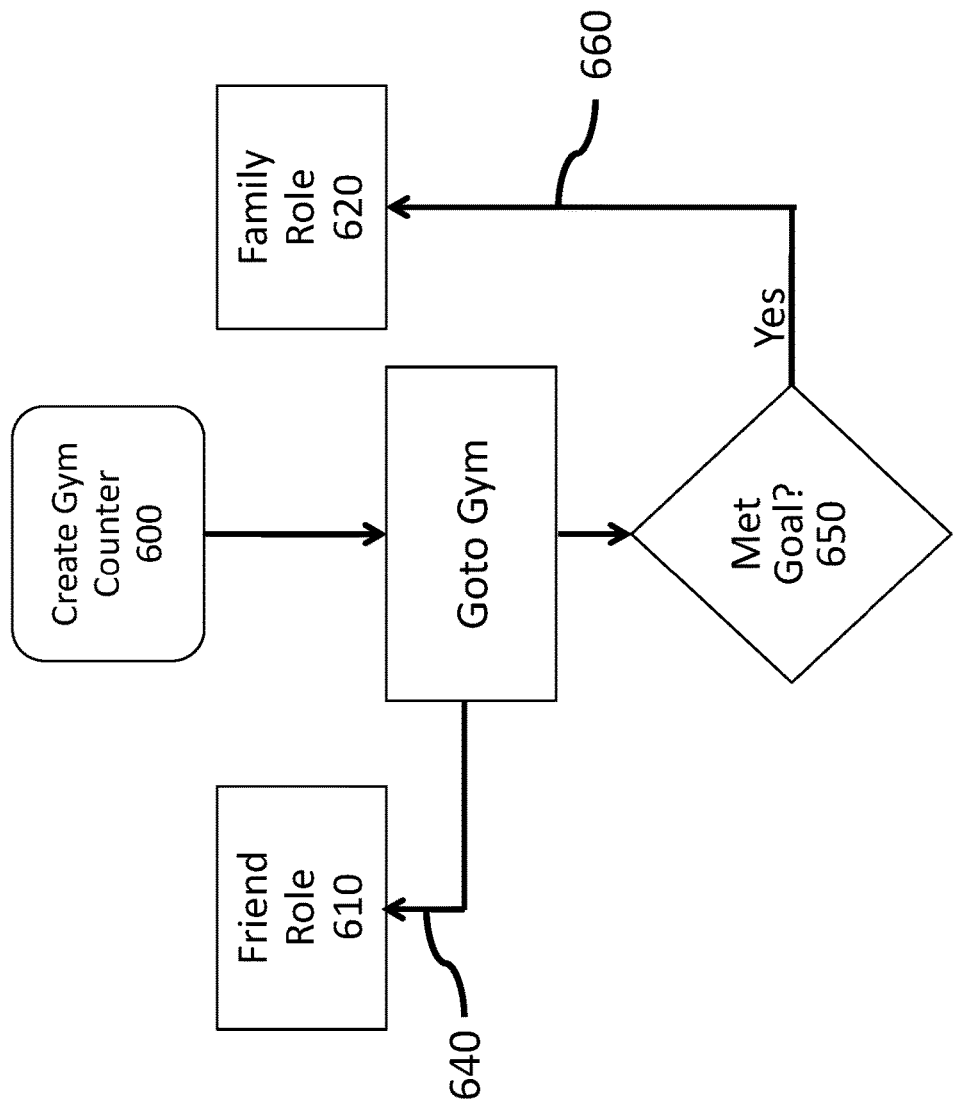
FIG. 6 illustrates an example of the use of roles in a counter implemented in accordance with an embodiment of the invention.

FIG. 6 shows how a counter 600 may also be configured with roles 610 and 620 for each device or service in the list. A role includes a tag identifying the role, and a list of datafields and the datafield tags that will be communicated to each device or service in the list associated with the role. Roles may be configured to communicate date only if a predetermined criterion is met. Roles allow a user to customize the amount and type of data communicated by a counter. In the gym example above, the two friends who are competing to lose weight may wish to share with each other their current weights and their goals, so they can create roles 610 that share that information 640. However, they may have other friends or family that only care when they reach their goal; in that case, each user can create a separate role 620 for those other friends and family that only communicate a message 660 once the goal weight it achieved 650. By using roles, a counter can be configured to send information to multiple devices and/or services, but the information communicated can be customized for each device or service.

Another example of a role would be a synchronization role, which would be configured to update a remote storage each time an event caused the counter to update its data, thereby providing for an automatic backup of counter data. Such a synchronization role could also be configured to run at a later time. For example, if a counter included a datafield that stored large amounts of data—for example, a video clip—when the counter updated the datafield in response to an event, the counter would communicate with the devices and services in its list. If one of the devices or services has a synchronization role, the role could wait to actually do the communication until a later time, for example, when it detected that it was within range of a wi-fi hotspot, or when the mobile device is connected to another device.

Figure 7:
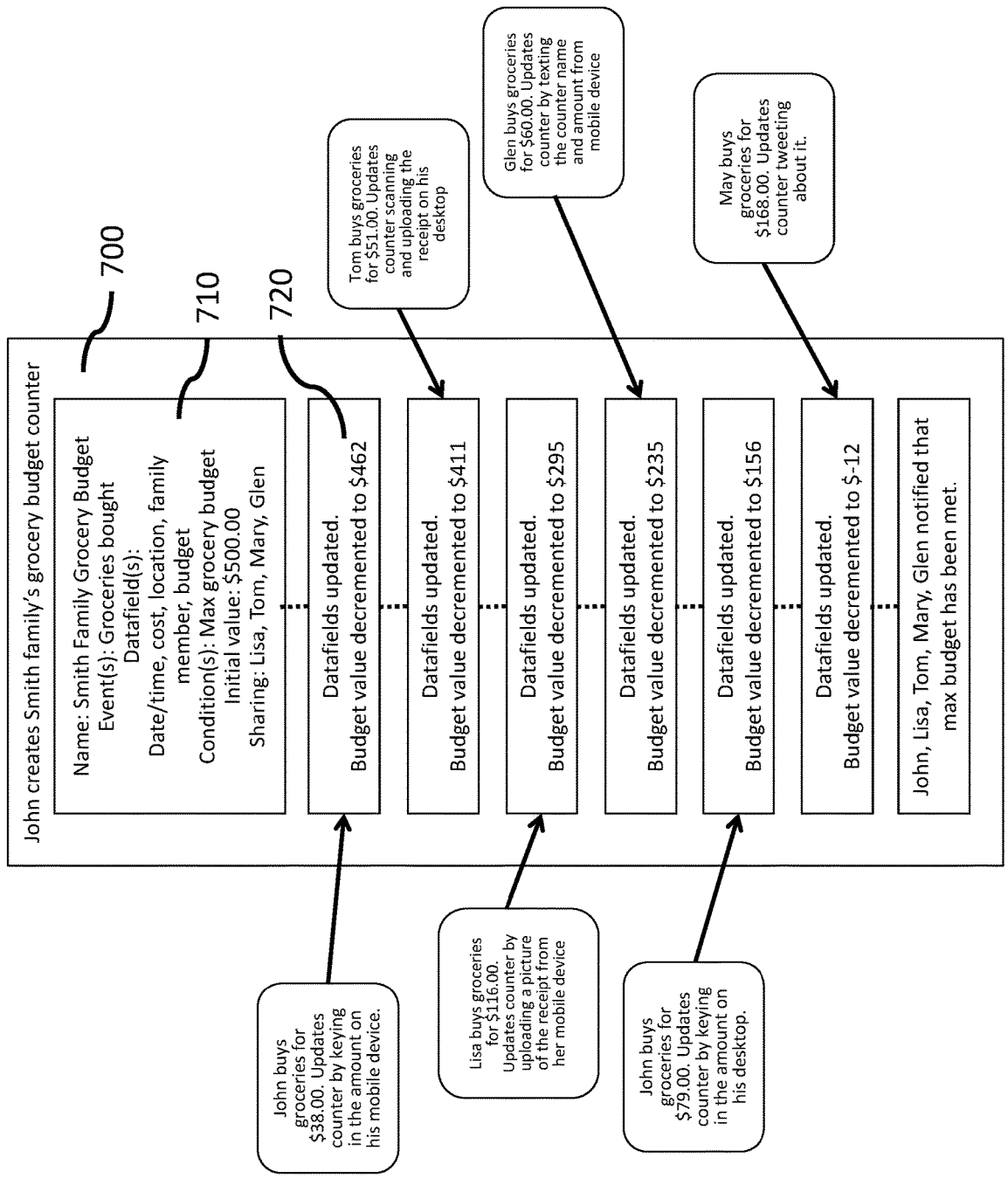
FIG. 7 illustrates an example of a budget counter implemented in accordance with an embodiment of the invention.

Although the preferred embodiment and other embodiments above have been described by way of the gym example, that is only a single example of a counter, and the invention should not be construed to be limited to the gym example. There are numerous other examples of the use of a counter as described in the embodiments. FIG. 7 shows how a counter can keep track of a budget. A counter 700 could be configured with a floating-point datafield 710 to keep track of spending. Each time the user spends money, the user could enter the amount spent into the counter, and the counter will increment the datafield to keep a running tab on the amount spent. The counter could be triggered to reset each month so that a month-by-month (or week-by-week or any other time frame) record could be kept of spending. The counter could be configured to communicate the data monthly to a money-management software package. The counter could also be configured to decrement 720 the amount spent from a starting amount; this could be used to determine, for example, how much is left from a given budget. The counter could be configured to pull data from a banking app, for example, to help keep track of the current bank balance. Alternatively, the counter could be configured to remind the user to enter information when it receives information that a particular credit card or debit card has been used, or the counter may be configured to to obtain that information automatically. For example, if a transaction is not entered into the budget counter at the time the transaction is made, when the transaction is processed by the bank or credit card company, the counter could be notified and either update the counter automatically, or prompt the user to update the counter. Mobile devices with e-wallet capability, for example, could also communicate with the counter to automate the entry of the dollar figure.

It is also possible to use the photographic capabilities of a device to automate data entry. The device's camera could be used to capture the amount of a transaction—for example, the numbers on a gas pump—and the resulting image could be parsed to determine the amount spent and, if needed, the amount of gas dispensed. The counter could be configured to perform the parsing of the photographs, and then automatically enter the data into the datafields as needed.

It is also possible to configure the counter to alert the user if an event doesn't occur. For example, if a counter is configured to keep track of when and how much medication a user is taking, the counter could also be configured to alert the user, using any one of the displays or alerts previously discussed, that the medication event hasn't occurred, thereby reminding the user to either enter the data or to take the medication.

Figure 8:
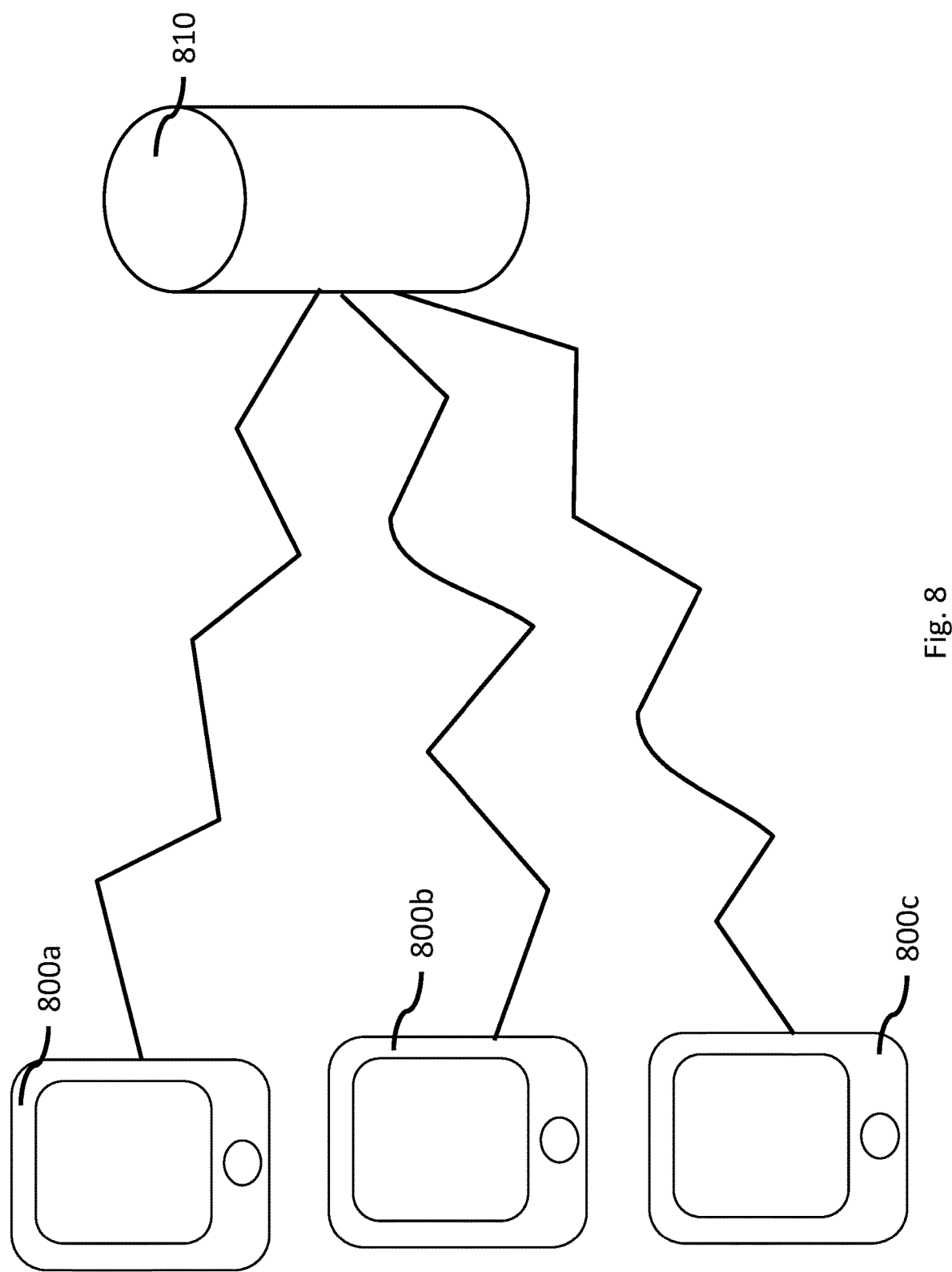
FIG. 8 illustrates an example of a client-server counter system implemented in accordance with an embodiment of the invention.

FIG. 8 shows how it is also possible to create the system using a client-server architecture. In such an architecture, some or all of the counter functionality and data storage described herein is moved to a server 810 and off of the mobile devices 800a-c. In an embodiment of a counter system implemented as a server-based system, the counter and data would be maintained on a central server 810. A mobile device 800a-c would download an app, as described previously, and the app would implement a communications session with the server 810. The user of the mobile device would then create and initialize one or more counters as described previously, with some or all of the counter's functionalities and data residing on the server 810 and the remainder of the counter's functionalities and data residing on the mobile device 800a-c.

In an embodiment of a server-based system, a user would create a counter that would be stored on a server. When the event associated with the counter occurs, the mobile device would initiate a communications session with the server, and would communicate information to the server that would include identification information to identify the mobile device, identification information to identify the counter to be updated, and information to identify the event that has occurred. When the server receives the information from the mobile device, it can update the datafields in the counter and then communicate the updated values back to the mobile device for display or storage.

The server can also be implemented to handle communications between mobile devices that want to share counter information, as described above. For example, if a counter associated with a mobile device is set up to share information with a counter associated with another mobile device upon occurrence of an event, when the server receives information from the first device that the event has occurred, it will initiate a communications session with the second device, and transmit the requisite information to the second mobile device. Preferably, the communications will occur in such a way that it appears to the users of the mobile devices that they are communication directly with one another.

The server-based system can be implemented such that each mobile device that will be using counters is registered with the system. For example, before the first counter is created by a particular mobile device, the system may require certain information from the mobile device such that the server can identify the mobile device and its associated counters each time a communications session is initiated with that particular mobile device. Preferably, the information will be such that either the device or the user or both can be identified by the server. For example, the server could require that each user identify the mobile device by entering a phone number to identify the device, and create a username/password combination to identify the user. The system could also be implemented such that the device information be sent automatically from the device to the server when the app is downloaded, or when the app is run on the mobile device for the first time.

Preferably, the server would be implemented to completely back up the data and counter information for each counter regardless of how much functionality is implemented on the mobile device. The backup would be available in the event the user's mobile device fails or is replaced, so that the user could implement the counters on a repaired or new mobile device without loss of continuity. Further, should the server-based system be implemented using a registration system, the server could be implemented to allow a user to access the stored counters or data from any mobile or non-mobile system using the user's registration information. The server could be configured to allow the user to access and download data associated with a counter. For example, a user that is using a counter to keep track of purchases may access the historical record of his or her purchases and download the data for insertion into a spreadsheet or accounting program.

There are numerous ways to implement the server-based system. In the simplest form, the server could simply be a storage location for data from each counter that is stored on the mobile device or simply a backup of data and counter information from the mobile device. In the most server-centric form, everything is stored on the server, and the mobile device is just a thin client, with the app on the mobile device simply initiating a communications session with the server, and with all information and data being sent from the server to the mobile device once the communications session is initiated. Preferably, the server-based system is a combination of server-side and client-side functionality. For example, it may be preferable to implement the server to store templates, icons, and other information and data used to create counters on the server. This will minimize the need to store unneeded information on the mobile device, and can allow the administrator of the system to update the templates and other counter information and data without requiring the users to update their mobile devices. In another example, it may be preferably to implement the server to store the historical data associated with each counter, again to minimize the amount of data stored on the mobile device. In these examples, any information, data, or functionality as described above that is not implemented on the server will be implemented on the mobile device.

Although the preferred embodiment has been described with reference to specific exemplary embodiments, it will be evident that various modifications and changes can be made to these embodiments without departing from the broader spirit and scope of the invention as set forth. Accordingly, the specification and drawings are to be regarded in an illustrative rather than a restrictive sense.

What is claimed is:

1. A method for sharing and updating information between a plurality of electronic devices, each electronic device having the ability to determine its geographical location, the method comprising:
    storing a first geographical location of a first device in a first counter, said first counter comprising a first field to store the first geographical location, wherein the first data field is stored in memory and is identified by a tag;
    associating an event with said first counter; updating the first data field upon occurrence of said event, wherein said updating the first data field comprises determining a second geographical location of the first device, and storing the second geographical location in the first field;
    wirelessly sending the second geographical location of the first device to a second device, said second device wirelessly receiving the second geographical location from the first device and storing the second geographical location in a second counter, said second counter comprising a second data field to store the second geographical location, wherein the second data field is stored in memory and is identified by a tag;
    determining the second device's current geographical location;
    storing the second device's current geographical location in a third field in the second counter; and
    wirelessly sending the second device's current geographical location to the first electronic device.

2. The method of claim 1, further comprising:
    the first electronic device storing the received second device's current geographical location in a received data field in the first counter.

3. The method of claim 1, wherein the event comprises the passage of a predetermined period of time.

4. The method of claim 1, wherein the event comprises an interaction with a user of the first electronic device.

5. The method of claim 1, wherein the event comprises an interaction with a user of the second electronic device.

6. The method of claim 1, wherein the event comprises the arrival of the first electronic device at a predetermined geographical location.

7. The method of claim 1, wherein the event comprises the arrival of the second electronic device at a predetermined geographical location.

8. The method of claim 1 wherein the event comprises receiving information from another electronic device.

9. The method of claim 1,
wherein the geographical location is determined using a geographical positioning system.

10. The method of claim 1,
wherein the geographical location is determined by a user of the electronic device entering a location.

11. The method of claim 1, wherein the geographical location is determined by a user of the electronic device selecting a position from a list of positions.

12. The method of claim 1, wherein the geographical location is determined using radio signals.

13. The method of claim 1, further comprising a third electronic device, the third electronic device wirelessly receiving the geographical location from at least one of the first or second electronic device.

14. The method of claim 13, further comprising:
the third electronic device receiving the second geographical location from the first electronic device;
the third electronic device receiving the second electronic device's current geographical location;
the the third electronic device comparing the second geographical location from the first electronic device and the second electronic device's current geographical location against a predetermined criterion; and
sending a notification to at least one of the first or second electronic devices.

15. A system for sharing and updating information between a plurality of electronic devices, the system comprising:
a plurality of electronic devices, each electronic device comprising:
a geographical location determiner;
one or more processors; and
at least one computer-readable storage medium having stored therein instructions which, when executed by the one or more processors, cause the plurality of electronic devices to:
store a first geographical location of a first electronic device in a first counter, said first counter comprising a first field to store the first geographical location, wherein the first data field is stored in memory and is identified by a tag;
associate an event with said first counter; updating the first data field upon occurrence of said event, wherein said updating the first data field comprises determining a second geographical location of the first device, and storing the second geographical location in the first field;
wirelessly send the second geographical location of the first device to a second device, such that said second device wirelessly receives the second geographical location from the first device and stores the second geographical location in a second counter, said second counter comprising a second data field to store the second geographical location, wherein the second data field is stored in memory and is identified by a tag;
determine the second device's current geographical location;
store the second device's current geographical location in a third field in the second counter; and
wirelessly send the second device's current geographical location to the first electronic device.

16. The system of claim 15, wherein the event comprises the passage of a predetermined period of time.

17. The system of claim 15, wherein the event comprises an interaction with a user of one of the plurality of electronic devices.

18. The system of claim 15, wherein the event comprises the arrival of one of the plurality of electronic devices at a predetermined location.

19. The system of claim 15, wherein the event comprises the electronic device receiving information from another of one of the plurality of electronic devices.

20. The system of claim 15, wherein the geographical location determiner determines a geographical position using a geographical positioning system.

21. The system of claim 15, wherein the geographical location determiner determines a determine geographical position by prompting the user to enter a location.

22. The system of claim 15, wherein the geographical location determiner determines a geographical position by prompting a user to select from a list of locations.

23. The system of claim 15, wherein the geographical location determiner determines a geographical position using radio signals.

24. The system of claim 15, wherein the computer-readable storage medium having stored therein instructions which, when executed by the one or more processors, cause the plurality of electronic devices to further:
receive the geographical locations of at least two different electronic devices of the plurality of electronic devices;
compare the received geographical locations of the at least two different electronic devices of the plurality of electronic devices; and
send a notification to at least one of the electronic devices of the plurality of electronic devices.

25. The system of claim 24, wherein the notification is sent to one of the at least two different electronic devices in the plurality of electronic devices.

* * * * *